(12) United States Patent
Dougherty et al.

(10) Patent No.: US 6,881,957 B2
(45) Date of Patent: Apr. 19, 2005

(54) PASSIVE INFRARED DEVICE FOR DETECTION OF BOUNDARY CROSSINGS

(75) Inventors: Brian C. Dougherty, Terre Haute, IN (US); Robert M. Bunch, Terre Haute, IN (US); Rachel E. Lukens, Terre Haute, IN (US); James Nagel, Valparaiso, IN (US); Christopher L. Wolfe, Peru, IN (US)

(73) Assignee: Home Data Source, LLC, Indianapolis, IN (US)

( * ) Notice: Subject to any disclaimer, the term of this patent is extended or adjusted under 35 U.S.C. 154(b) by 211 days.

(21) Appl. No.: 10/338,531

(22) Filed: Jan. 8, 2003

(65) Prior Publication Data

US 2004/0129883 A1 Jul. 8, 2004

(51) Int. Cl.[7] .................................................. G01J 5/00
(52) U.S. Cl. .............................. 250/338.3; 250/DIG. 1; 250/338.1
(58) Field of Search ..................... 250/338.3, DIG. 1, 250/338.1, 336.1; 340/565, 541, 540, 500, 567

(56) References Cited

U.S. PATENT DOCUMENTS

| | | |
|---|---|---|
| 3,703,718 A | 11/1972 | Berman |
| 3,751,664 A | 8/1973 | Faibel |
| 3,867,038 A | 2/1975 | Westell |
| 4,263,585 A | 4/1981 | Schaefer |
| 4,346,427 A | 8/1982 | Blissett et al. |
| 4,800,368 A | 1/1989 | Wisner |
| 4,864,136 A | 9/1989 | Behlke |
| 5,045,702 A | 9/1991 | Mulleer |
| 5,083,025 A | 1/1992 | Blomberg |
| 5,107,120 A | 4/1992 | Tom |
| 5,291,020 A * | 3/1994 | Lee ............................ 250/342 |
| 5,567,941 A | 10/1996 | Fujikawa et al. |
| 5,598,066 A | 1/1997 | Wiesemann et al. |
| 5,712,622 A | 1/1998 | Grossinger et al. |
| 5,764,146 A | 6/1998 | Baldwin et al. |
| 6,037,594 A | 3/2000 | Claytor et al. |
| 6,078,253 A | 6/2000 | Fowler |
| 6,166,625 A | 12/2000 | Teowee et al. |
| 6,214,626 B1 | 4/2001 | Meller et al. |
| 6,324,008 B1 | 11/2001 | Baldwin et al. |
| 6,326,621 B1 | 12/2001 | Kamada et al. |
| 6,348,863 B1 * | 2/2002 | Krubiner et al. ............ 340/567 |
| 6,774,791 B1 * | 8/2004 | Krubiner et al. ............ 340/567 |

OTHER PUBLICATIONS

Fisher, B., Perkins, S., Walker, A., and Wolfart, E., Zero Crossing Detector. Department of Artifical Intelligence, University of Edinburgh, UK [online] 1994. [Retrieved on Nov. 20, 2002]. Retrieved from the Internet: <URL:http://www.cee.hw.ac.uk/hipr/html/zeros.html>.

How Infrared Motion Detector Components Work [online]. [Retrieved on Oct. 14, 2002]. Retrieved from the Internet: <URL:http://www.glolab.com/pirparts/infrared.html>.

Blount, G., Pyroelectric Sensors [online]. [Retrieved on Oct. 14, 2002]. Retrieved from the Internet: <URL:http://www.plazaearth.com/usr/gasperi/pyro.html>.

* cited by examiner

*Primary Examiner*—David Porta
*Assistant Examiner*—Christine Sung
(74) *Attorney, Agent, or Firm*—Maginot, Moore & Beck (57) ABSTRACT

A passive low power device for detection of boundary crossings includes a dual element pyro-electric infrared (PIR) sensor. The sensor is designed with a lens that provides a very narrow field of view and two pyro-electric elements that produce a waveform with two voltage swings of opposite polarity when a warm object moves past the sensor. The waveform is filtered and amplified before it is passed on to a comparator. The comparator triggers off the extremes of each waveform. The comparator includes two outputs that are normally high, but go low when a change in infrared radiation is detected. A processor makes an approximation of the zero crossing time based on the rising edge of the first comparator output. This approximate zero crossing time serves as an estimate of the boundary crossing time.

20 Claims, 5 Drawing Sheets

PASSIVE INFRARED DEVICE FOR DETECTION OF BOUNDARY CROSSINGS

BACKGROUND

The present invention relates to the field of motion detection, and particularly, motion detection using passive infrared sensors.

Objects that generate heat, such as the human body, also generate infrared radiation. Although infrared radiation exists at a wavelength that is longer than visible light, devices exist for detecting infrared radiation. One such device is the pyroelectric sensor. The pyroelectric sensor is also referred to herein as the passive infrared (PIR) sensor. The pyroelectric sensor includes a pyroelectric element made of a crystalline material that generates a surface electric charge when exposed to heat in the form of electromagnetic radiation. When the amount of radiation striking the crystal changes, the amount of charge also changes. This change in the amount of charge is then measured. When a significant change in charge occurs, the sensor generates a signal representative of the change. Because the sensor is generally capable of detecting radiation over a wide frequency range, a filter window is added to the sensor to limit the incoming radiation to a certain desired frequency range. For example, the filter window may limit incoming radiation to a range that is most sensitive to the human body (e.g., 8 to 14 $\mu$m).

One type of PIR sensor is a sensor having two pyroelectric elements configured to produce voltages of opposite polarity when infrared radiation is detected. This arrangement with two detectors having opposing signals causes signals resulting from vibration, temperature changes and sunlight to be cancelled by the sensor, since in those situations, both pyroelectric elements fire at the same time. If the pyroelectric elements in such a PIR sensor are arranged in a horizontal plane, a warm body must pass horizontally in front of the sensor for an output to result. When a warm body does pass horizontally in front of the sensor, the first pyroelectric element will trigger and then the second, resulting in an output having a positive (or negative) voltage pulse immediately followed by a voltage pulse in the opposite direction.

Figure 1:
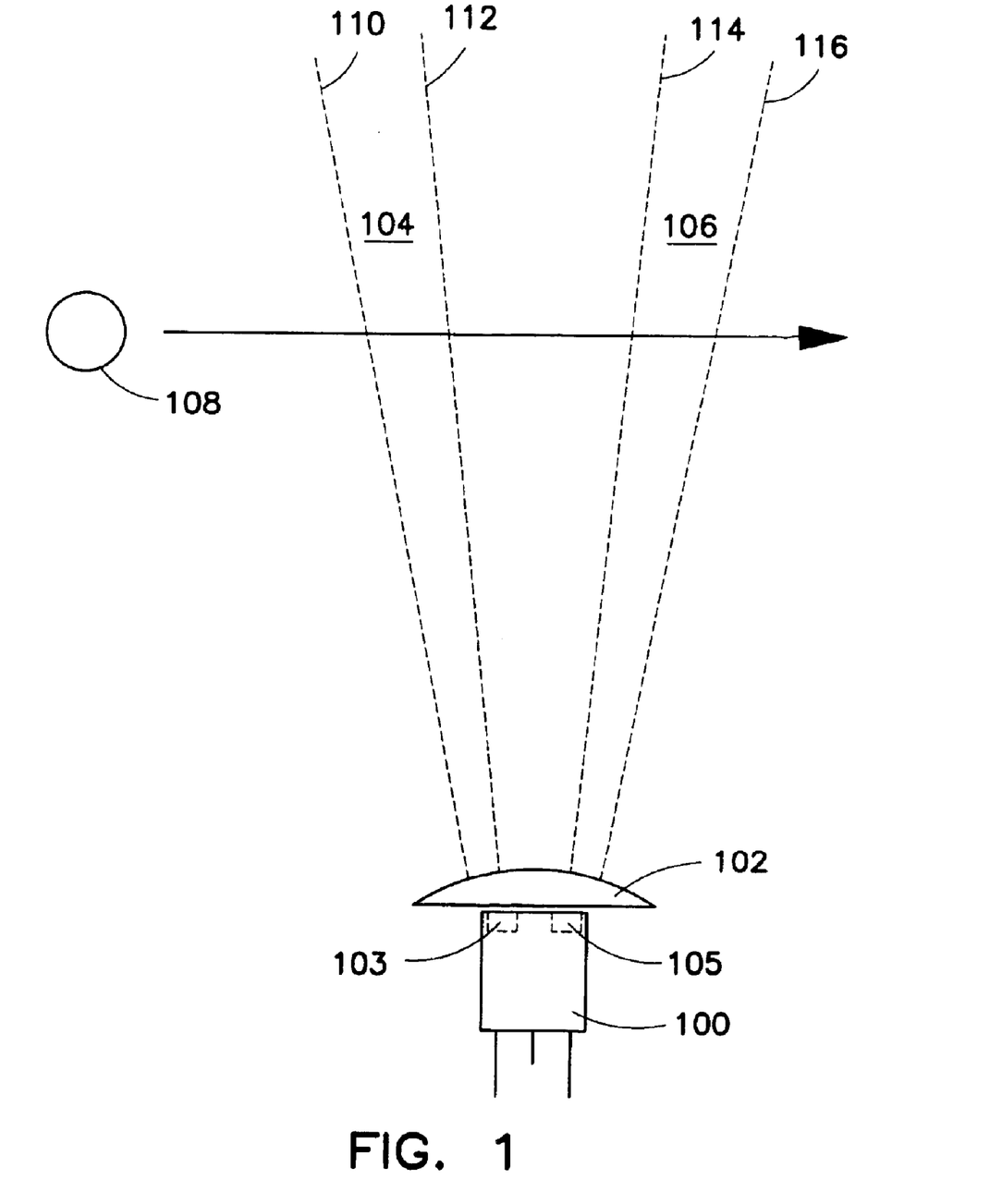
FIG. 1 is a top view of a pyroelectric sensor used to detect the direction of movement through a detection zone.

PIR sensors have been used for years in various applications. Perhaps the most common application is the use of the PIR sensor in security systems. For example, PIR sensors have been used to detect movement through a detection zone and the direction of movement through the detection zone. An exemplary arrangement for such a motion detection system using a PIR sensor is shown in FIG. 1. As shown in FIG. 1, a PIR detector 100 having a wide field of view is focused by a fresnel lens into two diverging detection zones. A first detection zone 104 is shown in FIG. 1 by dotted lines 110 and 112. A second detection zone 106 is shown by dotted lines 114 and 116. Although the fresnel lens 102 provides some focusing of the detection zones, the two detection zones 104 and 106 typically remain several feet removed in the area where a human would be detected. When a warm body 108, such as a human, enters the first detection zone 104, a first pyroelectric element 103 monitoring that detection zone indicates a change in infrared radiation in that zone, and a positive signal is output from the sensor 100. When the warm body enters the second detection zone 106, a second pyroelectric element 105 monitoring that detection zone indicates a change in infrared radiation in that zone, and a negative signal is output from the sensor 100. The direction of movement through the detection zones can be determined by noting whether the leading edge of the output signal was positive, indication the first pyroelectric element fired first, or negative, indicating the second pyroelectric element fired first. This arrangement is generally useful for detecting the presence of a warm body in the detection zones and/or the direction of movement through the detection zones. However, because the detection zones are several feet apart and not focused about a specific line, these arrangements are not useful in determining a precise moment that the warm body crossed a particular line.

Another arrangement for PIR sensors in home security applications includes the use of a PIR sensor as a general motion detector for a room. In these applications, a PIR sensor is often mounted in the corner of a room and operable to detect motion of a warm object within the room. These detectors typically include a single PIR sensor with a wide field of view and a lens having numerous facets that split the field of view into numerous corresponding detection sections with small "blind spots" between the sections. When the PIR sensor detects a change in infrared light between facets, the motion detector provides a signal to indicate movement in the room. As with other PIR sensor arrangements, these PIR sensors have proved adequate for motion detection over a wide area, but have not been useful for detection of motion through a well defined line or boundary.

Motion through a well defined line has typically been detected using a beam of light such as a laser. These "through beam" lasers transmit a stream of light across a distance, with the laser defining the boundary to be monitored. When the through beam laser is broken, a receiver opposite the light transmitter detects that the light beam has been broken. Alternatively, when the light beam is broken, a receiver next to the transmitter will pick up reflected light and detect that the light beam has been broken. Unfortunately, these "through beam" detectors have several disadvantages. First, they tend to consume a large amount of energy. In order to reduce energy consumption, the through beam may be periodically pulsed, but such a pulse could possibly result in a breach of the line without detection if the period of the pulse is significant. Second, through beam detectors are costly because both a light transmitter and a receiver are required. Third, if the receiver is to be mounted opposite the transmitter, housings for the detection system must be located in different areas of a space, making the existence of the detector more noticeable.

PIR sensors are typically inexpensive and operate on very low energy requirements. Accordingly, a PIR sensor that could be used to detect motion through a well defined line or boundary would be useful in a number of human monitoring applications. Such a detector would be useful for generally detecting movement of a human across a defined boundary. Furthermore, such detectors could be useful in noting the precise moment when an individual crossed a boundary, and if used in combination, the average rate of speed of an individual over a defined distance.

SUMMARY

The present invention is directed to an apparatus for detecting boundary crossings. The apparatus comprises a PIR sensor having a first pyroelectric element and a second pyroelectric element. The first pyroelectric element is operable to monitor a first detection zone and produce a positive signal when the first pyroelectric element detects a change of infrared radiation in the first detection zone. The second pyroelectric element is operable to monitor a second detection zone and produce a negative signal when the second pyroelectric element detects a change of infrared radiation in the second detection zone. The positive signal and the negative signal are combined to provide an output waveform from the PIR sensor.

The output waveform of the PIR sensor is filtered and amplified and delivered to a comparator. The comparator is operable to provide a first response signal when the output waveform rises above a first threshold and a second response signal when the output waveform falls below a second threshold. The first and second response signals of the comparator are provided to a processor. The processor is operable to estimate the zero crossing of the output waveform based on the first and second response signals of the comparator. The zero crossing estimate is representative of a boundary line crossing.

In one embodiment, two PIR detectors are positioned in a pathway, such as the hallway of a home, and used to determine the rate of speed of an individual traveling down the hallway. Accordingly, a first PIR sensor defines a first detection zone and produces a first output waveform when the first detection zone is crossed. A first processor is connected to the first PIR sensor and is operable to estimate a first boundary line crossing based on the first output waveform. Likewise, a second PIR sensor defines a second detection zone and is operable to produce a second output waveform when the second detection zone is crossed. A second processor is connected to the second PIR sensor, and the second processor is operable to estimate a second boundary line crossing based on the second waveform. A central controller is in communication with the first processor and second processor and is operable to calculate an average speed of an individual through the pathway based on the time of the first boundary line crossing and the time of the second boundary line crossing.

DESCRIPTION

Figure 2:
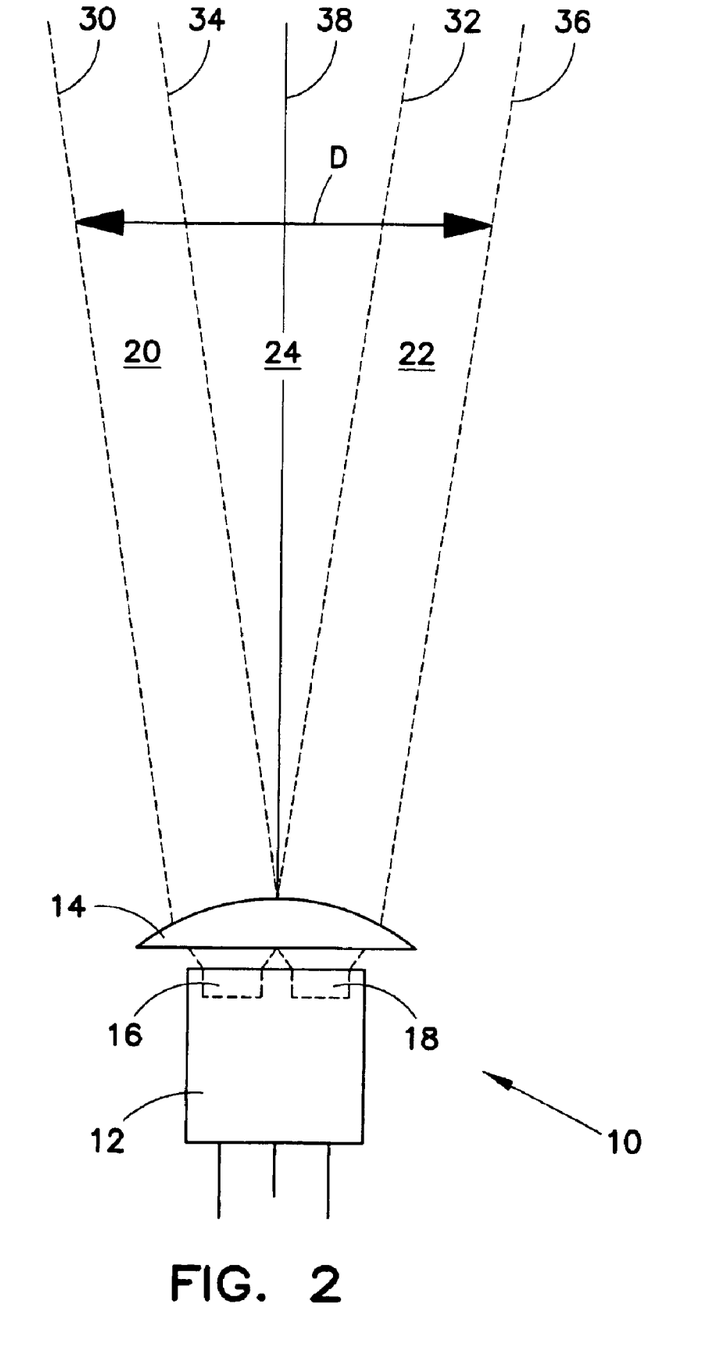
FIG. 2 is a top view of a passive infrared sensor for use in detecting boundary crossings.

With reference to FIG. 2, a passive infrared (PIR) device 10 is provided for detection of boundary crossings. The device 10 includes a PIR sensor 12 with two pyroelectric elements and a lens 14. The position of the pyroelectric elements on sensor 12 is represented reference numerals 16 and 18. The lens 14 focuses the field of view/detection zone of the two pyroelectric elements within a substantially frustro-conical detection space ranging from about two to four inches in diameter. The diameter of the detection space flares from about two inches near the PIR device to about four inches at a distance of five feet from the PIR device. The detection space includes a first detection zone 20 and a second detection zone 22. The first detection zone is monitored by a first of the two pyroelectric elements 16. Dotted lines 30 and 32 define the first detection zone. The second detection zone 22 is monitored by a second of the two pyroelectric elements 18. Dotted lines 34 and 36 define the second detection zone. The first and second detection zones significantly overlap to form a third detection zone 24 that includes part of the first detection zone and part of the second detection zone. A boundary line 38 runs through the center of the third detection zone 24.

The two pyroelectric elements 16 and 18 monitor small relative temperature changes in the left and the right portions of the boundary line. The first pyroelectric element is positioned on the left side of the boundary line 38 and generates a positive signal that is output from PIR sensor 12 when it detects a change in infrared radiation in the first detection zone 20. The second pyroelectric element is positioned on the right side of the boundary line 38 and generates a negative signal that is output from PIR sensor 12 when it detects a change of infrared radiation in the second detection zone. The signals generated by the first and second pyroelectric elements are combined to provide a single output from the PIR sensor 12.

Figure 3:
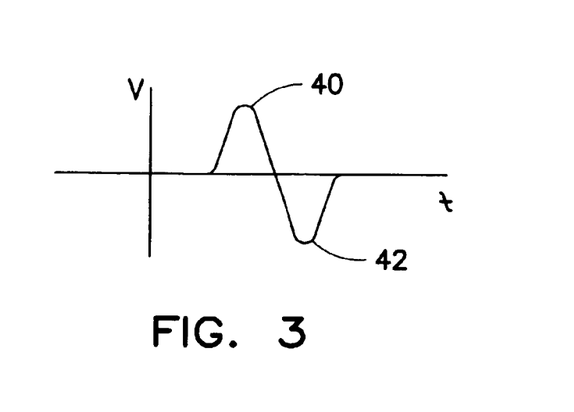
FIG. 3 is an exemplary waveform output from the passive infrared sensor of FIG. 2.

If a person or other warm object passes through the detection zones 20 and 22 from left to right, the PIR sensor will output a signal that rises and falls, as shown in FIG. 3. The positive portion of the signal represents a change in the infrared radiation present in the first detection zone. As the warm body enters the second detection zone 22, the warm body will also be in the third detection zone 24 that overlaps the first and second detection zones, and both pyroelectric elements will have an output. Because the outputs of the two pyroelectric elements are opposite, and a zero crossing will occur somewhere in this third detection zone, and most likely about the time the warm body passes the boundary line 38. The outputs of the first and second pyroelectric elements are triggered upon detection of a warm body, and are not necessarily continuous as the warm body passes through the detection zones. Therefore, the exact location of the boundary crossing is dependent upon the speed of the warm body through the first and second detection zones. Accordingly, determination of the zero crossing of the output of the PIR sensor is an estimation of the point where the warm body crossed the boundary line 38, and not necessarily the precise boundary crossing. As the warm body proceeds out of the first detection zone 20 and through the second detection zone, the negative output 42 of the PIR sensor, representing a change in infrared radiation in the second detection zone, will return to zero.

In addition to determining a boundary crossing, the direction that the object was traveling can also be detected by noting whether the PIR sensor first output positive or negative signal. For left to right travel, a positive output is followed by a negative output. For right to left travel, a negative followed by a positive pulse will be sent.

Figure 4:
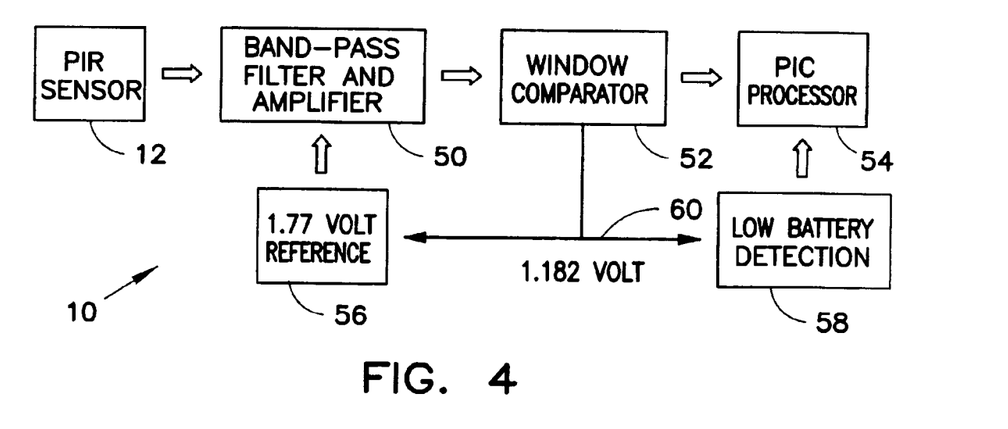
FIG. 4 is a block diagram showing the layout of a passive infrared device incorporating the sensor of FIG. 2.

With reference to FIG. 4, a block diagram of the PIR device 10 is shown. The PIR device includes a dual element PIR sensor 12 having an output that feeds into a band-pass filter and amplifier 50. After the output of the PIR device is filtered and amplified through the band-pass filter and amplifier 50, it is added to the 1.77 volt DC offset and is fed to a comparator 52. The comparator 52 has two digital outputs that are fed to a processor 54. The two outputs are normally high, but the first output of the comparator drops low if the input to the comparator is significantly higher than 1.77 volts (e.g., 1.92 volts or more). The second output of the comparator drops low if the input to the comparator is significantly lower than 1.77 volts (e.g., 1.62 volts or less). Based on the status of the comparator 52 outputs, the processor 54 can estimate the zero crossing of the signal output from the PIR sensor 12. The comparator 52 also provides a 1.182 volt reference 60 that is used to provide the 1.77 volt reference 56. The 1.182 volt reference is also fed to a low battery detector 58 which uses the 1.182 volt reference in determining whether the battery power is low.

Figure 5:
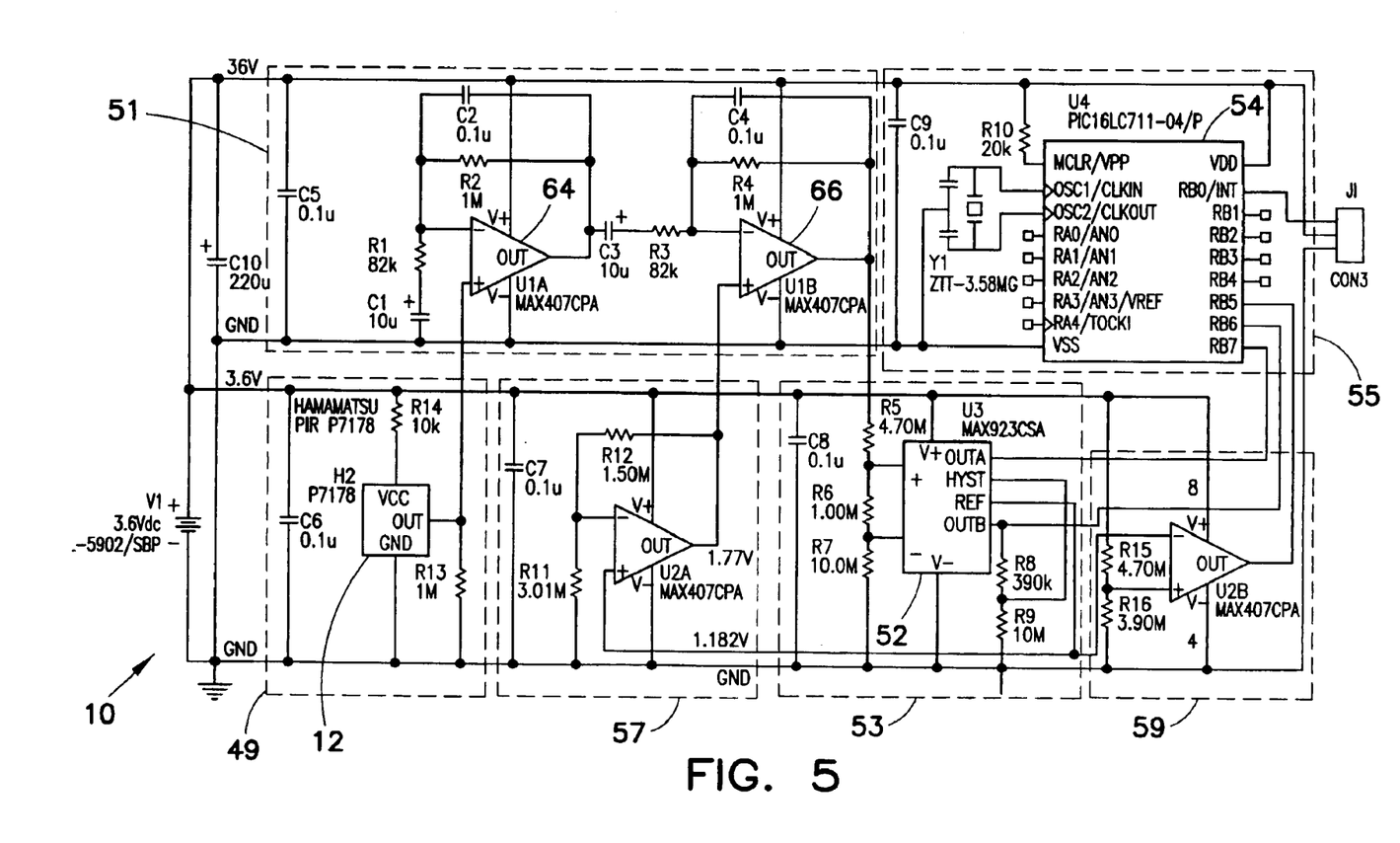
FIG. 5 is a schematic showing the layout of elements used in the passive infrared device of FIG. 4.

FIG. 5 shows a detailed view of the circuit used to implement the PIR device 10 as summarized in the block diagram of FIG. 4. The circuit shown in FIG. 5 has been divided by function into several distinct boxes using dotted lines. In particular, the PIR sensor 12 and associated circuitry is identified by box 49. The circuitry used to implement the band-pass filter and amplifier is identified by box 51. The comparator and related circuitry is identified by box 53. The processor and related circuitry is identified by box 55. The circuitry used to provide the 1.77 volt reference source is identified by box 57, and the circuitry used to implement the low battery detector is shown within box 59.

PIR Sensor

A dual element pyro-electric infrared (PIR) sensor 12, as shown in box 49, is used to generate the initial signal from the PIR detector. An acceptable PIR sensor is the Hamamatsu PIR P7178. Of course, other commercially available sensors could also be used to provide the signal. When a warm body walks through the field of view of the PIR sensor 12, its output is a small, low frequency signal riding on a DC offset. The resistor values provided in box 49 help to minimize bias current around the device while maintaining enough of a voltage swing to be detectable.

With reference again to FIG. 2, a fresnel lens 14 is placed in front of the two pyro-electric elements is the sensor 12. The lens focuses the field of view of each pyro-electric element such that the diameter D of the field of view of the PIR sensor is about two (2) inches immediately in front of the lens 14, and about four (4) inches at a distance of about five (5) feet away from the PIR sensor. One commercially available lens that will provide such focus is offered by Fresnel Technology, Inc., as item # 0.3, having a focal length of 0.6 inches and made of Poly IR® 2 material. Of course, other commercially available lenses will provide similar fields of view. Fields of view of six (6) inches or less about five (5) feet from the PIR sensor are most desirable.

As discussed previously, the two pyro-electric elements in the PIR sensor 12 are oriented in opposite directions, so that their signals essentially cancel for variations in the background temperature. Output from the PIR sensor 12 comes from a moving object (with a different temperature than the background) passing horizontally through the field of view. Motion of a warm object (like a person) in one direction will cause a positive then negative swing on the output of the sensor. Motion in the opposite direction will cause a negative then positive swing on the output. The zero crossing point between these swings corresponds to the time when the person passes the centerline (i.e., the boundary line 38 of FIG. 2) of the detector.

Band-Pass Filter and Amplifier

With reference again to FIG. 5, the output of the PIR sensor 12 must be amplified approximately one hundred (100) times to provide reasonable threshold levels to the comparator 52. Low pass filtering is needed to remove 60 Hz noise and any high frequency noise generated by the other circuits. Since the output signal from the PIR sensor is very small compared to the DC offset, it is also important to block the DC component and only amplify the low frequency signal. Accordingly, the output of the PIR sensor 12 is fed to a two-stage band-pass filter and amplifier 51. Each stage uses equal components to provide approximately 10 times gain and the same pass band.

The overall gain of this particular embodiment peaks at −118 at a frequency of 0.555 Hz (1.80 second period). A gain of −100 or more occurs over a window from 1.054 Hz (0.95 second period) to 0.293 Hz (3.41 second period). The half maximum gain (−59) or more occurs over a window from 1.945 Hz (0.51 second period) to 0.159 Hz (6.29 second period).

For the amplifier 64 in the first amplifier stage, the primary purpose for grounding the RC pair (R1, C1) going into the inverting input and running the PIR sensor output into the non-inverting input is to better isolate the PIR sensor (to not disturb its operating point). The output of this stage is a filtered, amplified, non-inverted version of the low frequency signal, riding on the un-amplified DC offset of the PIR sensor. The exact level of this offset should stay far enough from either voltage rail so that the amplified signal does not saturate. Furthermore, the level of the offset must be different from 1.77 V (in this case lower) so that a DC potential is properly placed across the polarized capacitor (C3).

The second amplification stage uses an inverting amplifier 66 to again filter and amplify the desired low frequency signal. The DC offset of the output for this stage is critical, however, because the output next goes to the comparators (which trigger on a relatively small threshold above and below the average level). The 1.77 volt reference circuit provides a stable voltage to the non-inverting input, which determines the DC offset (average level) of the output.

The commercially available MAX407 dual op-amp may be used for both the first and second amplifiers 64 and 66. The MAX407 is characterized by low current consumption (1.2 $\mu$A max per amplifier), single supply operation down to 2.5 V, and "rail-to-rail" output voltage swing. Of course, any number of alternative amplifiers could be used, including the MAX4471 (dual) and MAX4472 (quad) op-amps.

Window Comparator

The output of the two stage band-pass filter and amplifier 51 is sent to the window comparator 53. The window comparator circuit 53 has two active low digital outputs corresponding to either the positive swing or negative swing of the filtered and amplified signal from the two stage band-pass filter and amplifier 51. Both outputs will be high when the signal is within the window (i.e., when there is no motion in front of the detector). The outputs will drop low one at a time when the signal passes beyond a threshold from the average level. The average ("zero") level is given by the 1.77 volt reference applied to the final stage of the band-pass filter and amplifier. A value of +/−0.15 V is used for the threshold. This threshold provides good sensitivity for many walking speeds while not being easily triggered by insignificant signals on the 1.77 volt reference.

The MAX923 dual comparator 52 is used to implement the comparator circuit 53. The MAX923 can operate off a single supply voltage down to 2.5 V and only consumes about 4.5 $\mu$A of supply current. The MAX923 has a built-in voltage reference of 1.182 V, which sets the internal threshold for each comparator. The 1.182 V reference is also used externally by the 1.77 V reference circuit 57 and the low battery detection circuit 59. The 1.182 V reference is also used to set each comparator's hysteresis with resistors R8 and R9. The hysteresis added to the circuit causes the comparator outputs to delay returning to steady state until the input voltage approaches the "zero" value of 1.77 V. This makes the rising edge of the first output pulse occur very close to the zero crossing of the input signal (the approximate time when the person crosses the centerline of the detector), but it also leads to long final pulses as the signal asymptotically decays toward the average level.

Processor

The output of the comparator circuit 53 is delivered to a processor 54 for analysis. Any number of different processors are suitable for the processor, including the Microchip PIC16LC711, which will operate down to a 2.5 V supply. A 3.58 MHz ceramic oscillator, identified by reference Y1 is provided in association with the processor. The output of the processor RB0 is delivered to a connector identified as CON3 in FIG. 5. This connector relays the output of the processor to an RF transmitter board (not shown), which uses on/off keying based on the processor output RB0. The processor monitors the comparator and low battery signals to determine when to send an RF message, and the contents of the message.

1.77 Volt Reference

A 1.77 V reference circuit 57 provides a voltage reference to the final stage of the amplifier circuit 51, which uses the 1.77 V reference as the DC offset of the final amplified signal before it is passed on to the comparator 52. This average or "zero" signal level should be stable and near the center of the comparator window limits. The lower window threshold level can not be set below the 1.182 V internal threshold of the comparator, and the upper window threshold level should not be set above the minimum operating supply voltage (about 2.5 V).

Low Battery Detection

The low battery detector circuit 59 is provided as a warning when the PIR device 10 may need a new battery. A high output to the processor 54 from the low battery detection circuit 59 indicates the battery is providing acceptable power. On the contrary, a low output to the processor indicates that the battery is low.

Operation

In operation, a PIR device 10 for detecting boundary crossings is used to provide an in-home passive low-power boundary crossing detector. With reference to FIG. 2, a PIR sensor 12 may be positioned in a hallway or other area of a home to define a detection area having a narrow field of view D of a few inches and an associated boundary line 38. The PIR sensor is arranged in a detector with circuitry as shown in FIG. 5. When a warm object enters the first detection zone 20, the PIR sensor 12 generates a positive pulse. Immediately thereafter, the warm object enters the second detection zone 22 and the PIR sensor generates a negative pulse. The positive and negative pulses are combined as a single output resembling that shown in FIG. 3. This signal from the PIR sensor is then delivered to the bandpass filter and amplifier circuit 51 where the signal is amplified and combined with a DC offset of 1.77 volts. This signal is then delivered to the comparator circuit 53.

As mentioned previously, the comparator 52 includes two digital outputs that are normally high when no changes in infrared radiation have been detected. The outputs change when the signal received from the bandpass filter and amplifier circuit 51 are above or below 0.15 volts of the DC offset (i.e., greater than 1.92 V or less than 1.62 V). In the present example, the comparator 52 first receives the positive pulse greater than 1.92 V delivered from the bandpass filter and amplifier circuit 51. Upon receiving this positive pulse, the first output of the comparator 52 goes low. Thereafter, when the waveform falls back below about 1.77 volts, the first output returns high. As the waveform continues to fall and dips below 1.62 V as a result of the negative portion of the waveform, the second output of the comparator goes low. These responses from the first and second comparator outputs are delivered to the processor 54 for analysis as they occur.

The processor 54 interprets the signals from the comparator 52 and decides the appropriate response to the signals. In particular, when the processor notes that the first output has gone low, it wakes up from a sleep mode and begins looking for a return of the first output to high. When the first output returns to high, the processor estimates this to be the zero crossing of the waveform. This is also the estimate of the crossing of the warm object across the boundary line 38. Furthermore, depending upon whether the first output of the comparator or second output of the comparator triggered first, the processor can determine the direction of travel across the boundary line. In this example, the direction of travel is from left to right since the waveform delivered to the comparator had a positive pulse followed by a negative pulse. The determinations made by the processor 54, including estimated time of boundary crossing and direction of crossing are delivered to an RF transmitter (not shown) for delivery to a central controller (not shown) and further processing. The PIR detector provides a low power device that is operable to precisely approximate boundary crossings within inches or fractions of inches.

Figure 6:
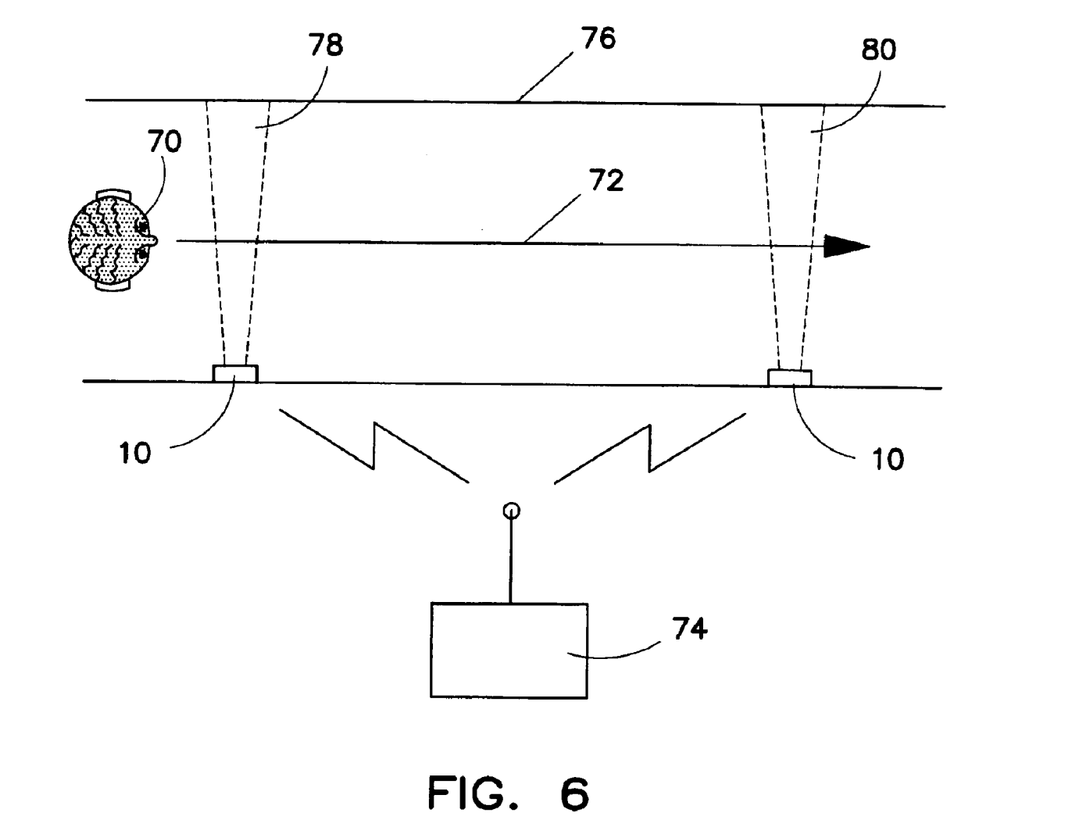
FIG. 6 is a top view of the passive infrared device of FIG. 4 used in a home monitoring application.

In addition to simple determination of boundary crossings, the PIR detector 10 may be used as an in-home speed detection system. With reference to FIG. 6, the in-home speed detection system includes two PIR devices 10 positioned in a commonly traveled pathway or passage of a home, such as a hallway 72 between a bedroom and a bathroom. The two PIR devices are positioned about ten feet apart along the pathway. Each of the two PIR detectors includes circuitry as shown in FIG. 5 and a lens. The two PIR devices define a first detection zone 78 and a second detection zone 80. Each detection zone 78 and 80 is about four inches in diameter about five feet from the PIR device 10.

A human 70 is shown traveling down the hallway 76 in the direction of arrow 72. When the human crosses one of the detection zones 78 or 80, the PIR detector 10 associated with that detection zone determines that a boundary crossing has occurred and sends an rf signal to a central controller 74 positioned within the home. The central controller 74 includes a microprocessor and has been programmed with data unique to the home, such as the distance between the two PIR detectors 10. Upon receipt of a boundary crossing from one of the two PIR detectors 10, the central controller logs the time and awaits receipt of a boundary crossing from the second PIR detector 10. After receiving the second boundary crossing, the central controller can calculate the average speed that the individual traveled down the hallway based on the time between boundary crossings and the distance between boundary lines.

The average speed of the individual traveling down the hallway may be particularly useful information for applications where an elderly individual is being monitored. In particular, historical data may be compiled about the average speed of the individual as he or she walks down the hallway. Should the speed of the individual significantly fall off, this may serve as a warning sign that the individual is experiencing some difficulties. These early warning signs can be particularly useful in early diagnosis of health issues and related problems for the individual.

Although the present invention has been described in considerable detail with reference to certain preferred versions applications thereof, other versions and applications are possible. For example, although the above description makes reference to a lens that focuses the field of view of the PIR sensor to less than six inches, other lenses that provide wider fields of view could be used. Therefore, the spirit and scope of the appended claims should not be limited to the description of the preferred versions contained herein.

What is claimed is:

1. A device for detecting a boundary crossing comprising:
   a) a PIR sensor having a first pyroelectric element and a second pyroelectric element, the first pyroelectric element operable to monitor a first detection zone and produce a positive signal when the first pyroelectric element detects a change of infrared radiation in the first detection zone, the second pyroelectric element operable to monitor a second detection zone and produce a negative signal when the second pyroelectric element detects a change of infrared radiation in the second detection zone, wherein the positive signal and the negative signal are combined to provide an output waveform; and
   b) a processor connected to the PIR sensor and operable to estimate a zero crossing of the output waveform.

2. The device of claim 1 further comprising a comparator connected between the PIR sensor and the processor, the comparator operable to provide a first signal to the processor when the output waveform rises above a first threshold and a second signal to the processor when the output waveform falls below a second threshold.

3. The device of claim 1 wherein the zero crossing estimate is representative of a boundary line crossing.

4. The device of claim 1 wherein the first pyroelectric element and the second pyroelectric element provide a field of view for the PIR sensor, and the field of view has a diameter of about four inches about five feet from the PIR sensor.

5. The device of claim 1 wherein the processor is connected to an RF transmitter operable to deliver the zero crossing estimate to a central controller.

6. A system for detecting the average speed of an individual through a pathway, the system comprising:
   a) a first PIR sensor positioned in the pathway, the first PIR sensor defining a first detection zone and operable to produce a first output waveform when the first detection zone is crossed;
   b) a second PIR sensor positioned in the pathway a defined distance from the first PIR sensor, the second PIR sensor defining a second detection zone and operable to produce a second output waveform when the second detection zone is crossed;
   c) a first processor connected to the first PIR sensor, the first processor operable to estimate a first boundary line crossing based on the first output waveform;
   d) a second processor connected to the second PIR sensor, the second processor operable to estimate a second boundary line crossing based on the second waveform; and
   e) a central controller in communication with the first processor and second processor, the central control operable to calculate an average speed through the pathway based on the time of the first boundary line crossing and the time of the second boundary line crossing.

7. The system of claim 6 wherein the first PIR sensor includes two pyroelectric elements positioned therein and the first output waveform includes a zero crossing.

8. The system of claim 7 wherein the first processor is operable to estimate the zero crossing of the first waveform and determine the first boundary line crossing based on the zero crossing estimate.

9. The system of claim 6 wherein a comparator is connected between the first PIR sensor and the first processor.

10. The system of claim 6 wherein the first PIR sensor has a field of view that is less than six inches in diameter about five feet from the first PIR sensor.

11. A device for detecting a boundary crossing comprising:
    a) a PIR sensor having two pyroelectric elements, the PIR sensor operable to produce an output waveform having a zero crossing;
    b) a bandpass filter and amplifier connected to the PIR sensor and operable to filter and amplify the output waveform;
    c) a comparator connected to the bandpass filter and amplifier, the comparator operable to provide a response when the output waveform is greater than a first threshold or less than a second threshold; and
    d) a processor connected to the comparator, the processor operable to estimate the zero crossing of the waveform based on the response of the comparator, the zero crossing providing an estimate of the boundary crossing.

12. The device of claim 11 wherein the comparator includes a first output and a second output, the first output providing the response when the output waveform is greater than the first threshold and the second output providing the response when the output waveform is less than the second threshold.

13. The device of claim 12 wherein the processor is operable to determine the direction of the boundary crossing based upon whether the first output or the second output was first to provide the response.

14. The device of claim 11 wherein the processor is connected to an RF transmitter operable to transmit the estimate of the zero crossing to a central controller.

15. The device of claim 11 wherein a lens is positioned in front of the PIR sensor, the lens providing a field of view for the PIR sensor of less than six inches approximately five feet from the PIR sensor.

16. A method of determining a boundary crossing comprising the steps of:
    a) providing a PIR sensor having a first pyroelectric element and a second pyroelectric element, the first pyroelectric element operable to monitor a first detection zone and produce a positive signal when the first pyroelectric element detects a change of infrared radiation in the first detection zone, the second pyroelectric element operable to monitor a second detection zone and produce a negative signal when the second pyroelectric element detects a change of infrared radiation in the second detection zone, wherein the positive signal and the negative signal are combined to provide an output waveform;
    b) determining the zero crossing of the output waveform; and
    c) estimating the boundary crossing based on the zero crossing of the output waveform.

17. The method of claim 16 further comprising the step of limiting the first detection zone and the second detection zone to a diameter of less than six inches at about five feet from the PIR sensor.

18. A method of detecting the average speed of an individual through a pathway, the method comprising the steps of:

a) providing a first PIR sensor positioned in the pathway, the first PIR sensor defining a first detection zone and operable to produce a first output waveform when the first detection zone is crossed;

b) providing a second PIR sensor positioned in the pathway a defined distance from the first PIR sensor, the second PIR sensor defining a second detection zone and operable to produce a second output waveform when the second detection zone is crossed;

c) analyzing the first output waveform and estimating a first boundary line crossing based on the first output waveform;

d) analyzing the second output waveform and estimating a second boundary line crossing based on the second output waveform; and e) calculating an average speed through the pathway based on the time of the first boundary line crossing and the time of the second boundary line crossing.

19. The method of claim 18 wherein the first PIR sensor includes two pyroelectric elements positioned therein and the first output waveform includes a zero crossing.

20. The method of claim 19 wherein the step of analyzing the first output waveform includes estimating the zero crossing of the first waveform and determining the first boundary line crossing based on the zero crossing estimate.

* * * * *